United States Patent
Locker et al.

(10) Patent No.: US 9,288,612 B2
(45) Date of Patent: Mar. 15, 2016

(54) INVITING DEVICES TO JOIN A MESH NETWORK

(71) Applicant: LENOVO (Singapore) PTE, LTD., New Tech Park (SG)

(72) Inventors: Howard Locker, Cary, NC (US); James Wesley Williams, II, Apex, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 259 days.

(21) Appl. No.: 13/913,162

(22) Filed: Jun. 7, 2013

(65) Prior Publication Data

US 2014/0362836 A1    Dec. 11, 2014

(51) Int. Cl.
*H04W 92/18* (2009.01)
*H04W 4/00* (2009.01)
*H04W 4/02* (2009.01)

(52) U.S. Cl.
CPC .............. *H04W 4/008* (2013.01); *H04W 4/023* (2013.01)

(58) Field of Classification Search
CPC ..... H04W 92/18; H04W 76/02; H04W 4/008; H04W 84/10; H04W 24/00; H04W 28/18; H04W 48/16; H04W 8/005; H04W 12/08; H04W 36/24; H04W 4/00; H04W 4/001
USPC .................. 455/41.1, 404.2, 519, 214, 414.1; 370/328
See application file for complete search history.

(56) References Cited

U.S. PATENT DOCUMENTS

| | | | | |
|---|---|---|---|---|
| 8,208,917 | B2* | 6/2012 | Ueda | 455/426.2 |
| 8,565,676 | B2* | 10/2013 | Gormley et al. | 455/41.1 |
| 2006/0040693 | A1* | 2/2006 | Yoon et al. | 455/519 |
| 2010/0061294 | A1* | 3/2010 | Proctor et al. | 370/328 |
| 2012/0214416 | A1* | 8/2012 | Kent et al. | 455/41.2 |
| 2014/0114780 | A1* | 4/2014 | Menefee et al. | 705/21 |
| 2014/0369483 | A1* | 12/2014 | Lovitt et al. | 379/202.01 |
| 2015/0050880 | A1* | 2/2015 | Choi et al. | 455/39 |

* cited by examiner

*Primary Examiner* — Minh D Dao
(74) *Attorney, Agent, or Firm* — Kunzler Law Group (57) ABSTRACT

An apparatus, method, and program product are disclosed for inviting devices to join a mesh network. A network interface is accessible by a processor and a memory stores machine readable code executable by the processor. The machine readable code includes a network module configured to establish a mesh network via the network interface. The mesh network includes one or more electronic devices. The machine readable code includes a proximity module configured to detect a first electronic device within close proximity to a second electronic device. The first electronic device is not connected to the mesh network and the second electronic device is connected to the mesh network. The machine readable code includes an invitation module configured to send mesh network connection information to the first electronic device from the second electronic device in response to determining the first electronic device is within close proximity to the second electronic device.

18 Claims, 6 Drawing Sheets

INVITING DEVICES TO JOIN A MESH NETWORK

FIELD

The subject matter disclosed herein relates to mesh networks and more particularly relates to inviting devices to join a mesh network.

BACKGROUND

Description of the Related Art

In general, a computer network can be a telecommunications network that connects one or more devices and allows communication and data exchange between systems, software applications, and users. Typically, various devices may connect to a network, such as desktop computers, laptop computers, tablets, smart phones, or other devices that include networking capabilities. Computer networks, generally, also include various networking hardware components. These components can include switches, hubs, bridges, routers, or other components that help direct and propagate network traffic as it travels between one or more devices connected to the network.

However, it may be undesirable to have network traffic pass through the various networking components because the traffic may be snooped or stored. The ability to set up a closed or private network between one or more devices may be more desirable and may not require the networking components found in typical networks. In a closed or private network, however, devices may need to be invited to join the network by devices connected to the network.

BRIEF SUMMARY

A method for inviting a device to join a mesh network is disclosed. An apparatus and computer program product also perform the functions of the method.

In one embodiment, an apparatus is described that includes a network interface accessible by a processor and a memory storing machine readable code executable by the processor. The machine readable code, in one embodiment, includes a network module configured to establish a mesh network via the network interface. The mesh network may include one or more electronic devices. In another embodiment, the machine readable code includes a proximity detection module configured to detect a first electronic device within close proximity to a second electronic device. The first electronic device, in some embodiments, is not connected to the mesh network and the second electronic device is connected to the mesh network. In yet another embodiment, the machine readable code includes an invitation module configured to send mesh network connection information to the first electronic device from the second electronic device in response to determining the first electronic device is within close proximity to the second electronic device.

In one embodiment, the proximity module includes a touch detection module configured to detect the first and second electronic devices are physically touching to verify the first electronic device is within close proximity to the second electronic device. In some embodiments, the touch detection module establishes a near field communication (NFC) connection between the first and second electronic devices to verify the first and second electronic devices are physically touching. In certain embodiments, the invitation module sends mesh network connection information from the second electronic device to the first electronic device over an NFC connection in response to the first and second electronic devices establishing an NFC connection.

In other embodiments, the touch detection module determines the first and second electronic devices are within a predetermined distance of each other and senses the first and second electronic devices vibrated at the same time to verify the first and second electronic devices are physically touching. The touch detection module, in another embodiment, determines whether a force of the vibration is within a predetermined threshold to verify the first and second electronic devices are physically touching. In certain embodiments the invitation module sends mesh network connection information from the second electronic device to the first electronic device using a wireless communication standard in response to the first and second electronic devices physically touching. In some embodiments the wireless communication standard is selected from the group consisting of BlueTooth, WiFi, and infrared.

In one embodiment, the invitation module selects a wireless communication standard to send mesh network connection information between the first and second electronic devices, the wireless communication standard being selected based on the wireless communication capabilities of the first and second electronic devices. In some embodiments, the first and second electronic devices having at least one compatible wireless communication standard. In certain embodiments, the mesh network comprises a wireless communication standard different than the wireless communication standard used to send mesh network connection information from the second electronic device to the first electronic device.

In one embodiment, the machine readable code includes a handshaking module configured to establish the wireless communication parameters between the first and second electronic devices. In another embodiment, the machine readable code includes a user confirmation module configured to prompt a user to confirm a mesh network invitation sent by the invitation module. In some embodiments, the mesh network connection information is transferred from the second electronic device to the first electronic device in response to a positive user confirmation. In yet another embodiment, the machine readable code includes an encryption module configured to encrypt data sent between the one or more electronic devices connected to the mesh network.

In one embodiment, the method includes establishing a mesh network. In some embodiments, the mesh network includes one or more electronic devices. In another embodiment, the method includes detecting a first electronic device within close proximity to a second electronic device. In a further embodiment, the first electronic device not connected to the mesh network and the second electronic device connected to the mesh network. In yet another embodiment, the method includes sending mesh network connection information to the first electronic device from the second electronic device in response to determining the first electronic device is within close proximity to the second electronic device.

In one embodiment, the method includes detecting the first and second electronic devices are physically touching to verify that the first electronic device is within close proximity to the second electronic device. In a further embodiment, the method includes establishing a near field communication (NFC) connection between the first and second electronic devices to verify the first and second electronic devices are physically touching. In another embodiment, the method includes sending mesh network connection information from the second electronic device to the first electronic device over an NFC connection in response to the first and second electronic devices establishing an NFC connection.

In one embodiment, the method includes determining the first and second electronic devices are within a predetermined distance of each other and sensing the first and second electronic devices vibrated at the same time to verify the first and second electronic devices are physically touching. In a further embodiment, the method includes sending mesh network connection information from the second electronic device to the first electronic device using a wireless communication standard in response to the first and second electronic devices physically touching. In certain embodiments, the wireless communication standard is selected from the group consisting of BlueTooth, WiFi, and infrared.

In one embodiment, the mesh network comprises a wireless communication standard different than the wireless communication standard used to send mesh network connection information from the second electronic device to the first electronic device.

A program product is disclosed including a computer readable storage medium storing machine readable code executable by a processor. In one embodiment, the machine readable code establishes a mesh network. In some embodiments, the mesh network includes one or more electronic devices. In a further embodiment, the machine readable code detects a first electronic device within close proximity to a second electronic device. In certain embodiments, the first electronic device is not connected to the mesh network and the second electronic device is connected to the mesh network. In another embodiment, the machine readable code sends mesh network connection information to the first electronic device from the second electronic device in response to determining the first electronic device is within close proximity to the second electronic device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Figure 1:
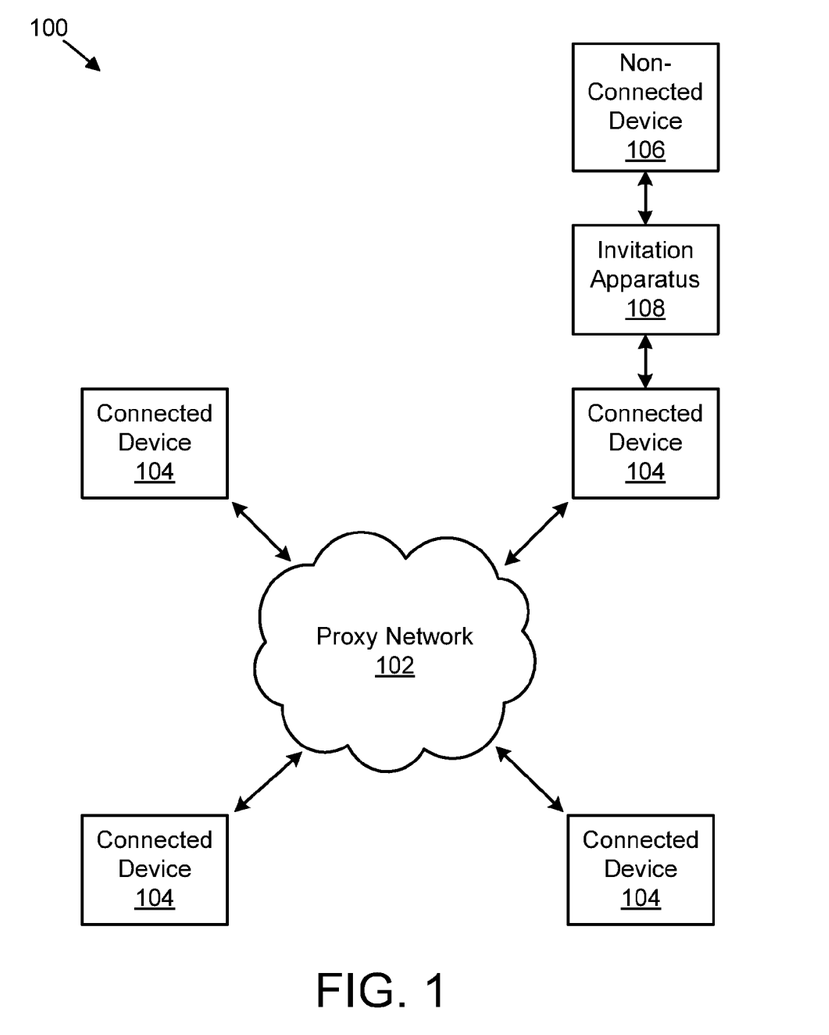
FIG. 1 is a schematic block diagram illustrating one embodiment of a system for inviting a device to join a mesh network in accordance with the present subject matter.

Descriptions of Figures may refer to elements described in previous Figures, like numbers referring to like elements. FIG. 1 depicts a schematic block diagram illustrating one embodiment of a system 100 for inviting a device to join a mesh network. In one embodiment, the system 100 includes a mesh network 102, one or more connected devices 104, a non-connected device 106, and an invitation apparatus 108.

Even though a certain number of devices are illustrated in the depicted embodiment, there could be any number of connected 104 and non-connected 106 devices.

The mesh network 102, in one embodiment, is a network that is established between one or more connected electronic devices 104 and is configured to transmit digital communications from and/or to the one or more connected devices 104. The mesh network 102 may be a wireless network, such as a wireless telephone network, a local wireless network, such as a Wi-Fi network, a Bluetooth® network, and the like, or a wired network. In other embodiments, the mesh network may be a combination of wired and wireless electronic devices 104. The mesh network 102 may include a wide area network ("WAN"), a storage area network ("SAN"), a local area network ("LAN"), an optical fiber network, the Internet, or other digital communication network known in the art. The mesh network 102 may include two or more networks and/or one or more servers, routers, switches, and other networking equipment. The mesh network 102 may also include computer readable storage media, such as a hard disk drive, an optical drive, non-volatile memory, random access memory ("RAM"), or the like.

In one embodiment, the mesh network 102 may be embodied as a peer-to-peer (P2P) network. In an embodiment where the mesh network 102 is an unstructured P2P network, the connected devices 104 communicate privately within the mesh network 102. For example, the P2P mesh network 102 may not require sending digital communications through an internet that may require networking devices such as routers, hubs, switches, bridges, and/or the like, which can track, store, and read digital communications as they are sent through these devices. In certain embodiments, removing the networking devices from the mesh network 102 allows the connected devices 104 to privately and securely communicate without the network traffic being monitored by a third party. In other embodiments, the P2P mesh network 102 may implement a central infrastructure model where a centralized server propagates communication to and from the devices 104 through the server. In one embodiment, a connected device 104 may act as the centralized server to facilitate network traffic through the mesh network 102.

In another embodiment, the mesh network 102 allows connected devices 104 to connect to the Internet to access data, such as multimedia, documents, and/or the like. In one embodiment, the connected device 104 makes the downloaded content accessible to other devices 104 connected to the mesh network 102. For example, a connected device 102 may access a video from YouTube® to share with other connected devices 104 on the mesh network 102. In this manner, the only device 104 that is recognizable on the Internet is the device 104 that accessed the Internet, even though the other devices 104 are also accessing the content, which helps maintain the closed and private nature of the mesh network 102.

In a similar embodiment, the mesh network 102 utilizes a mesh networking topology such that every connected device 104 propagates network traffic through the mesh network 102 without using network devices such as routers, switches, hubs, or the like. For example, each connected device 104 in the mesh network 102 would act as a router by propagating traffic through the network 102 until the destination is reached. In one embodiment, there may be any number of devices 104 connected to the mesh network 102. In another embodiment, the number of devices 104 connected to the mesh network 102 may be restricted to a predetermined number of devices 104.

In one embodiment, the mesh network 102 is dissolved in response to the last connected device 104 leaving the mesh network 102. In some embodiments, the mesh network 102 is re-established in response to two or more connected devices 104 being within close proximity to each other. In most embodiments, the range of the mesh network 102, and thus the proximity that the connected devices 104 must be in relation to each other, depends on the capabilities of the wireless communication standard used to establish the mesh network. For example, a mesh network 102 using pear-to-peer WiFi as the wireless communication standard may require that a connected device 104 be within 300 feet of another connected device 104 to be connected to the mesh network 102. Other wireless communication standards, such as Bluetooth® or NFC, may have different specifications defining the proximity that a connected device 104 must be within to be connected to the mesh network 102.

In certain embodiments, connected devices 104 leave the mesh network 102 in response to being a certain distance away from the network. In another embodiment, a user presses a button on a device 104 in order to leave the mesh network 102. In other embodiments, devices 104 can rejoin the mesh network 102 in response to being within a certain distance of the network. For example, a group of friends may meet at a restaurant and establish a mesh network 102 while they are there. The friends may leave the restaurant, which may temporarily dissolve the mesh network 102, and then re-establish and rejoin the mesh network 102 when two or more of the friends are again within close proximity of each other, the proximity, in one embodiment, being defined by the range of the wireless communication standard. In some embodiments, the mesh network 102 is automatically re-established in response to two or more connected devices 104 being in close proximity to each other. In other embodiments, the users of the connected devices 104 need to confirm re-establishing the mesh network 102. In one embodiment, a connected device 104 enters a command to terminate the mesh network 102. In some embodiments, the connected device 104 that initially created the mesh network 102 may be the only connected device 104 with the capability to terminate the mesh network 102.

A connected device 104 and/or a non-connected device 106 may be embodied as an electronic device such as a computer, a phone, a server, a laptop computer, a tablet computer, a mainframe computer, a blade center, or any other electronic device capable of connecting to a mesh network 102. In one embodiment, the devices 104, 106 may be capable of wireless network communication using a wireless communication standard such as Bluetooth®, Wi-Fi (IEEE 802.11 standard), infrared, WAN, radio, or the like. In other embodiments, the devices 104, 106 are capable of near field communication (NFC), which provides wireless communication between devices 104, 106 by touching the devices 104, 106 together or bringing the devices 104, 106 within close proximity of each other, usually no more than a few centimeters, but it could be a larger distance. In one embodiment, a non-connected device 106 connects to the mesh network 102 by receiving an invitation from a connected device 104, which is described in more detail below.

Figure 2:
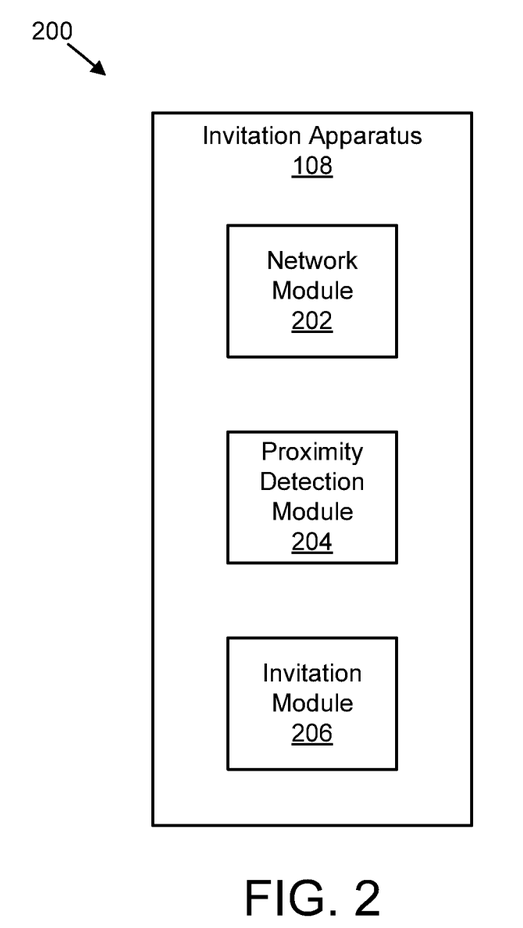
FIG. 2 is a schematic block diagram illustrating one embodiment of an apparatus for inviting a device to join a mesh network in accordance with the present subject matter.

FIG. 2 is a schematic block diagram illustrating one embodiment of an apparatus 200 for inviting a device 106 to join a mesh network that includes an invitation apparatus 108. The invitation apparatus 108 may include a memory storing machine readable code executable by a processor and a network interface that is accessible by the processor. The invitation apparatus 108, in certain embodiments, includes a network module 202, a proximity detection module 204, and an invitation module 206, which are described in detail below.

The network module 202, in one embodiment, is configured to establish a mesh network 102 via a network interface. As described above with reference to FIG. 1, the mesh network 102 may include one or more connected devices 104 communicating using a communication standard. In one embodiment, the connected devices 104 communicate using a wireless standard, such as WiFi, Bluetooth®, infrared, or the like. In another embodiment, the network module 202 establishes a peer-to-peer (P2P) network. The P2P network may be a private network such that only devices 104 connected to the network are able to view the traffic being sent through the network. In other embodiments, the mesh network 102 is not geographically dependent, but can be set up anywhere one or more connected devices 104 are within close proximity to each other.

For example, a group of friends may establish a mesh network 102 in a restaurant on one occasion and then on a different occasion re-establish the mesh network 102 in a movie theatre, in a friend's home, or in another location different than the restaurant. The network module 202 may also use a mesh network topology to establish the mesh network 102 such that traffic in the mesh network 102 is propagated by the devices 104 connected to the mesh network 102. In other embodiments, the network module 202 sets no limit on the number of devices 104 that can connect to the mesh network 102. In other embodiments, the network module 202 may limit the number of devices 104 that connect to the mesh network 102.

The apparatus 200, in certain embodiments, includes a proximity detection module 204 that is configured to detect whether a non-connected device 106 is within close proximity to a connected device 104. In some embodiments, the proximity detection module 204 detects a non-connected device 106 within close proximity to a connected device 104 in order to determine whether the non-connected device 106 is attempting to join the mesh network 102. In other embodiments, the proximity detection module 204 detects whether a non-connected device 106 is within close proximity in response to a connected device 104 entering a device detection mode. For example, a user of a connected device 104 may initiate a device detection mode of the device 104 by pressing a button on the device 104, entering a command on the device 104, or the like.

In another embodiment, the proximity detection module 204 detects whether the non-connected device 106 is within close proximity in response to a connected device 104 initiating contact and/or communication with the non-connected device 106, e.g., by physically touching devices 104, 106, sending electronic messages between devices 104, 106, or the like. By ensuring the connected device 104 communicating with the non-connected device 106 is secure, or, in other words, is using a secure operation to communicate with the non-connected device 106, the mesh network 102 is able to maintain secure access and data integrity without the mesh network 102 being compromised.

In another embodiment, the apparatus 200 includes an invitation module 206 configured to send mesh network connection information to a non-connected device 106 from a connected device 104 in response to the proximity detection module 204 determining that the non-connected device 106 is within close proximity to the connected device 104. The mesh network connection information may include an IP address, a network name, connection credentials, such as a username and/or password/passphrase, or the like. In other embodiments, the mesh network connection information includes any information necessary to join a peer-to-peer mesh network 102, which may depend on the wireless communication standard being used to establish the mesh network 102.

In one embodiment, the mesh network connection information is encrypted before it is transmitted from the connected device 104 to the non-connected device 106. The non-connected device 106 may store the mesh network connection information in response to joining the mesh network 102 such that the device 106 can automatically rejoin the mesh network 102 when in close proximity to the mesh network 102 without having to be invited again to join the mesh network 102.

In one embodiment, the invitation module 206 sends mesh network connection information from a connected device 104 to a non-connected device 106 using a wireless communication standard that is compatible with both devices 104, 106. In one embodiment, the invitation module 206 determines the wireless communication capabilities of the connected 104 and non-connected 106 devices and selects an appropriate wireless communication standard based on the wireless communication capabilities of the devices 104, 106. For example, if the devices 104, 106 are both capable of NFC communication, the invitation module 206 may send the mesh network connection information over an NFC connection established by the devices 104, 106. Similarly, the invitation module 206 may send mesh network connection information over a WiFi, Bluetooth®, or like communication standard depending on the compatible communication capabilities of the devices 104, 106.

In another embodiment, the invitation module 206 sends mesh network connection information using a different wireless communication standard than the wireless communication standard used by the mesh network 102. For example, the invitation module 206 may send mesh network connection information using NFC or Bluetooth® while the mesh network 102 utilizes WiFi for its communication standard. In some embodiments, the invitation module 206 uses the Internet (the cloud) to send a mesh network invitation to the non-connected device 106. For example, where the devices 104, 106 are communicating using a WiFi communication standard, a message may be sent to a cloud device in response to the devices 104, 106 physically touching. In some embodiments, each device 104, 106 would alert the cloud device that it vibrated in response to the devices 104, 106 physically touching. The cloud device may include a proximity detection module 204 that verifies the devices 104, 106 are within close proximity to each other and that they vibrated at the same time. If the proximity detection module 204 determines the devices 104, 106 are within close proximity, e.g., by using a location service, the cloud device may send a message to the invitation module 206 located on the connected device 104, which would then send the mesh network connection information to the non-connected device 106. The non-connected device 106, in one embodiment, confirms joining the mesh network 102 and receives mesh network connection information from the invitation module 206 through the Internet or another communication standard, such as Bluetooth®, WiFi, or the like.

Figure 3:
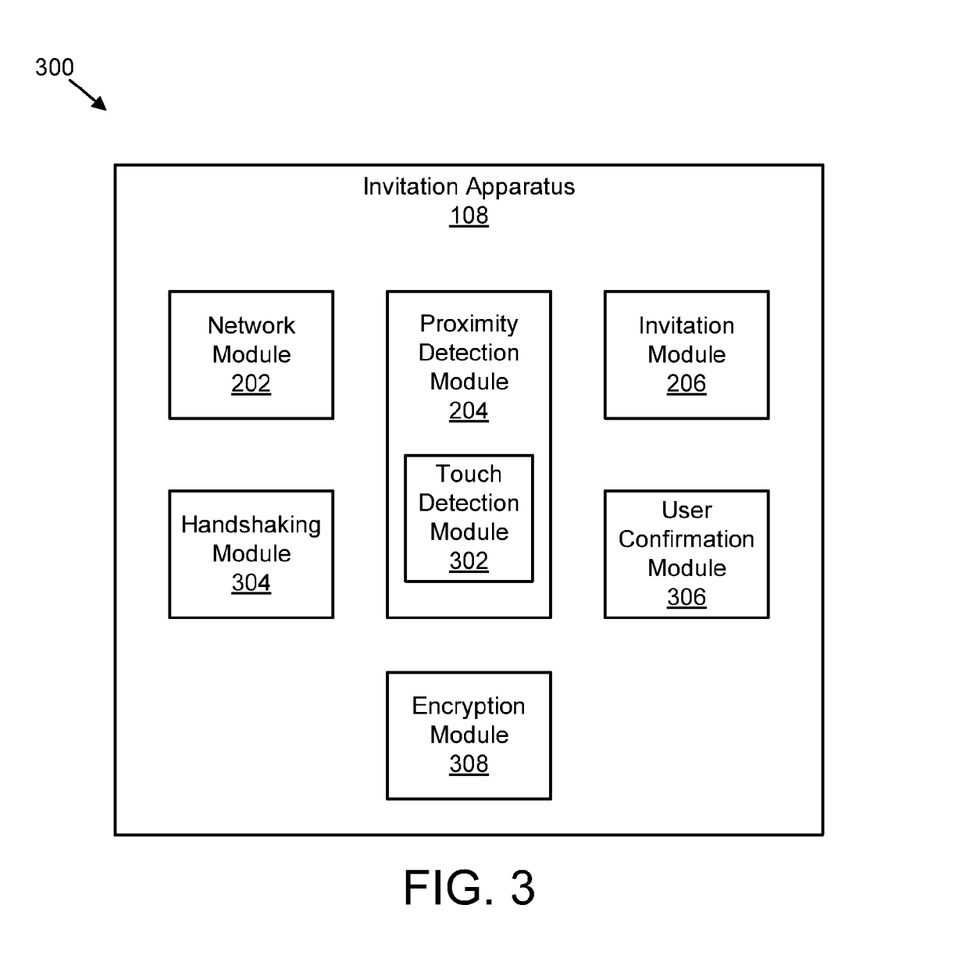
FIG. 3 is a schematic block diagram illustrating another embodiment of an apparatus for inviting a device to join a mesh network in accordance with the present subject matter.

FIG. 3 is a schematic block diagram illustrating another embodiment of an apparatus 300 for inviting a device 106 to join a mesh network. The apparatus 300 may include another embodiment of an invitation apparatus 108. In one embodiment, the invitation apparatus 108 includes a network module 202, a proximity detection module 204, and an invitation module 206, which are substantially similar to those described in relation to the apparatus 200 of FIG. 2. In some embodiments, the proximity detection module 204 includes a touch detection module 302. In various embodiments, the apparatus 300 includes a handshaking module 304, a user confirmation module 306, and an encryption module 308, which are described below.

The proximity detection module 204, in one embodiment, includes a touch detection module 302 that is configured to detect the connected device 104 and the non-connected device 106 are physically touching in order to verify that the non-connected device 106 is in close proximity to the connected device 104. In certain embodiments, the touch detection module 302 detects the devices 104, 106 are physically touching by establishing a near field communication (NFC) connection between the devices 104, 106 in response to the devices 104, 106 having NFC capabilities. For example, devices 104, 106 may be NFC enabled smart phones where data, such as mesh network connection information, can be transferred between the phones by tapping the phones together.

In other embodiments where the devices 104, 106 are NFC capable, the devices 104, 106 may not need to physically touch, but may only need to be close enough, usually within about a few centimeters, to establish an NFC connection. In one embodiment, where an NFC connection is established between the devices 104, 106, the invitation module 206 sends mesh network connection information from the connected device 104 to the non-connected device 106 using the NFC connection. In other embodiments, the invitation module 206 sends mesh network connection information to the non-connected device 106 over an NFC connection in response to the devices 104, 106 physically touching to establish the NFC connection.

Figure 4:
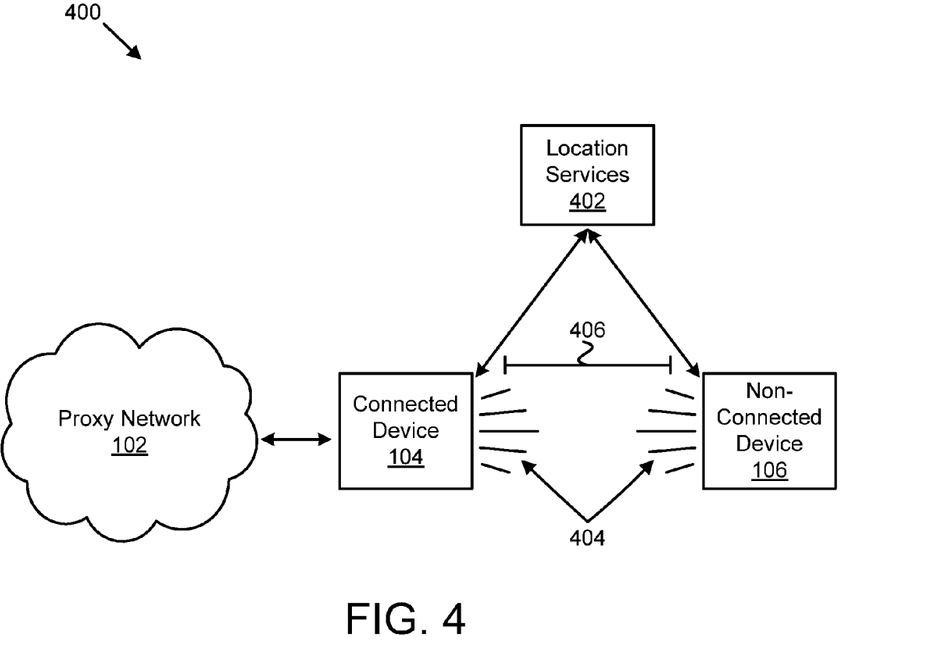
FIG. 4 is a schematic block diagram illustrating one embodiment of determining whether to send a mesh network invitation in accordance with the present subject matter.

In another embodiment, to verify the devices 104, 106 are physically touching, the touch detection module 302 determines the connected device 104 and the non-connected device 106 are within a predetermined distance of each other and also determines whether the devices 104, 106 vibrated at the same time. As used herein, a vibration could be any type of oscillation, movement, acceleration, shaking, pulsing, tapping, or the like, that may be detected by an electronic device 104, 106. For example, as depicted in FIG. 4, the touch detection module 302 may use location services 402, such as a global positioning system (GPS), control plane locating, GSM localization, near LBS, or the like, in combination with the positioning capabilities of the devices 104, 106 to determine the devices 104, 106 are within a predetermined distance 406 of each other. Further, the touch detection module 302 may use the vibration sensing capabilities 404 of the devices 104, 106, such as an accelerometer, to determine the devices 104, 106 vibrated at the same time. An accelerometer, as used herein, is a device used to detect and monitor vibration in electronic devices 104, 106. The touch detection module 302 may then conclude that the devices 104, 106 physically touched because they were in close proximity and vibrated at the same time.

In some embodiments, the touch detection module 302 additionally detects the force of the vibration of the devices 104, 106 to determine that the devices 104, 106 physically touched. The force of the vibration may be determined by a vibration sensor, such as an accelerometer, located in the devices 104, 106. The touch detection module 302 may set a threshold force that must be met in order to determine the devices 104, 106 physically touched. In this manner, the touch detection module 302 may determine the force of the vibration as a third parameter to help avoid accidental and/or insignificant touching where the devices 104, 106 physically touch, but the non-connected device 106 does not want to join the mesh network 102.

In one embodiment, the touch detection module 302 tracks the vibration patterns sensed by the vibration sensor in the devices 104, 106 and does an approximation fit to determine whether the devices 104, 106 physically touched. If the approximation fit of the vibration patterns is within a predetermined standard deviation of a baseline fit, then the touch detection module 302 may conclude the devices 104, 106 physically touched, assuming the devices 104, 106 are within close proximity to each other as determined using a location service and the positioning capabilities of the devices 104, 106.

In another embodiment, the touch detection module 302 determines whether the devices 104, 106 physically touched by using capacitive sensor capabilities of the devices 104, 106. For example, capacitive sensors may detect anything that touches a device 104, 106 that comprises conductive material. In other embodiments, the touch detection module 302 detects electrical resistance as one device 104, 106 comes in contact with another device 106, 104. In other embodiments, the touch detection module 302 may use any type of hardware capable of detecting physical contact between two devices 104, 106.

The apparatus 300, in another embodiment, includes a handshaking module 304 configured to establish the wireless communication parameters between the connected 104 and non-connected 106 devices. Handshaking may be used as an automated process of negotiation between two electronic devices that wish to communicate information to each other. In some embodiments, the handshaking module 304 dynamically sets the parameters of the communication channel used between the connected 104 and non-connected devices 106. The communication parameters may include the type of security protocol to use, the information transfer rate, the coding alphabet, parity, and/or the like. In one embodiment, the handshaking module 304 uses a cryptographic protocol, such as TLS or SSL, to securely transmit mesh network connection information between devices 104, 106. The invitation module 206 may send the network communication information from the connected device 104 to the non-connected device 106 in response to the handshaking module 304 establishing a communication channel between the devices 104, 106.

In one embodiment, the apparatus 300 includes a user confirmation module 306 configured to prompt a user to confirm a mesh network invitation sent by the invitation module 206. For example, in response to the proximity module 204 detecting the devices 104, 106 are within close proximity to each other, the user confirmation module 306 may prompt a connected device 104 user to confirm sending mesh network connection information for the mesh network 102 to the non-connected device 106. Similarly, the user confirmation module 306 may prompt a non-connected device 104 user to confirm receiving mesh network connection information for the mesh network 102 from the connected device 106.

The invitation module 206, in some embodiments, sends mesh network connection information from the connected device 104 to the non-connected device 106 in response to the user confirmation module 306 receiving positive user confirmation from one or both devices 104, 106. This provides an additional layer of security to ensure that devices 104, 106 are not inadvertently added to the mesh network when the devices 104, 106 are in close proximity to each other, such as devices that accidentally tap/touch, but where it is not desirable to have the non-connected device 106 join the mesh network 102.

In a further embodiment, the apparatus 300 includes an encryption module 308 configured to encrypt data sent between the one or more devices 104 connected to the mesh network 102. In one embodiment, the encryption module 308 encrypts data transferred between a connected device 104 and a non-connected device 106, such as a mesh network invitation, mesh network connection information, or the like. The encryption module 308 may use one or more data encryption schemes, such as symmetric-key encryption, public-key encryption, or the like, to encrypt data sent between devices 104. In another embodiment, the encryption module 308 selects an encryption scheme based on the capabilities of the devices 104 connected to the mesh network 102.

Figure 5:
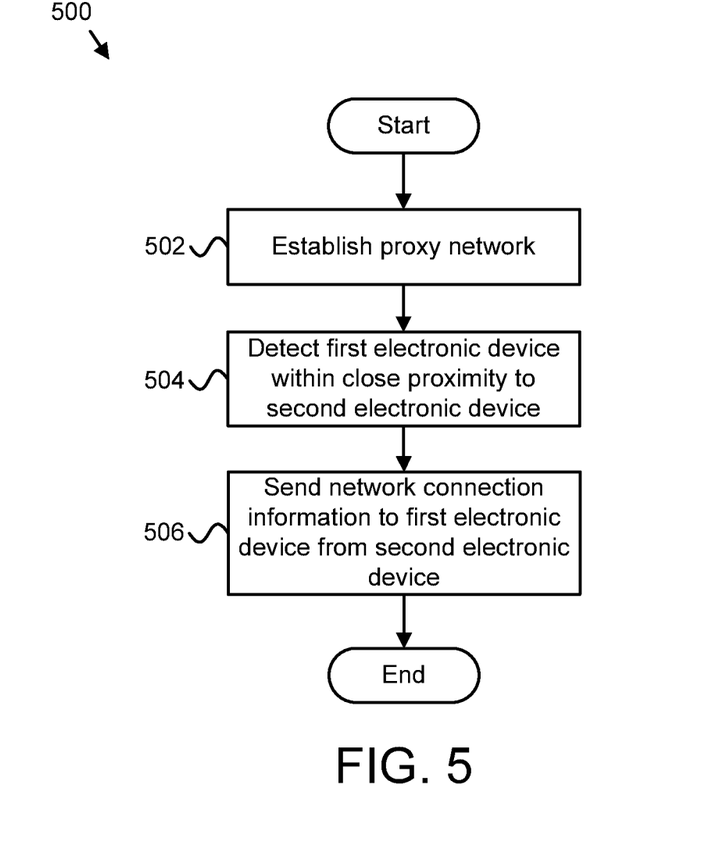
FIG. 5 is a schematic flow chart diagram illustrating one embodiment of a method for inviting a device to join a mesh network in accordance with the present subject matter.

FIG. 5 is a schematic flow chart diagram illustrating one embodiment of a method 500 for inviting a device 106 to join a mesh network 102. The method 500 begins and establishes 502 a mesh network 102. In one embodiment, a mesh network 102 is established by one or more electronic devices 104. In some embodiments, the mesh network 102 is a closed, private network that allows non-connected devices 106 to connect in response to receiving a mesh network invitation from a connected device 104. In certain embodiments, the mesh network 102 is established by a network module 202.

The method 500, in certain embodiments, detects 504 a non-connected device 106 within close proximity to a connected device 104. In one embodiment, a proximity detection module 204 is configured to detect whether a non-connected device 106 is within close proximity to a connected device 104. In some embodiments, the method 500 detects 504 a non-connected device 106 within close proximity to a connected device 104 in order to determine whether the non-connected device 106 is attempting to connect to the mesh network 102. In other embodiments, the method 500 detects 504 a non-connected device 106 within close proximity to a connected device 104 in response to a connected device 104 initiating contact and/or communication with the non-connected device 106. In other embodiments, the non-connected device 106 may initiate contact/communication with a connected device 104 within the mesh network 102.

In another embodiment, the method 500 sends 506 mesh network connection information to a non-connected device 106 from a device 104 connected to the mesh network 102. In certain embodiments, an invitation module 206 is configured to send the mesh network connection information in response to the method 500 determining the non-connected device 106 is within close proximity to the connected device 104. In one embodiment, the non-connected device 106 stores the mesh network connection information in response to joining the mesh network 102 such that the non-connected device 106 does not have to be invited again to join the mesh network 102, but will instead connect automatically if within close proximity to the mesh network 102. In certain embodiments, the mesh network connection information includes one or more of an IP address, a network name, connection credentials, such as a username and/or password/passphrase, or the like. And the method 500 ends.

Figure 6:
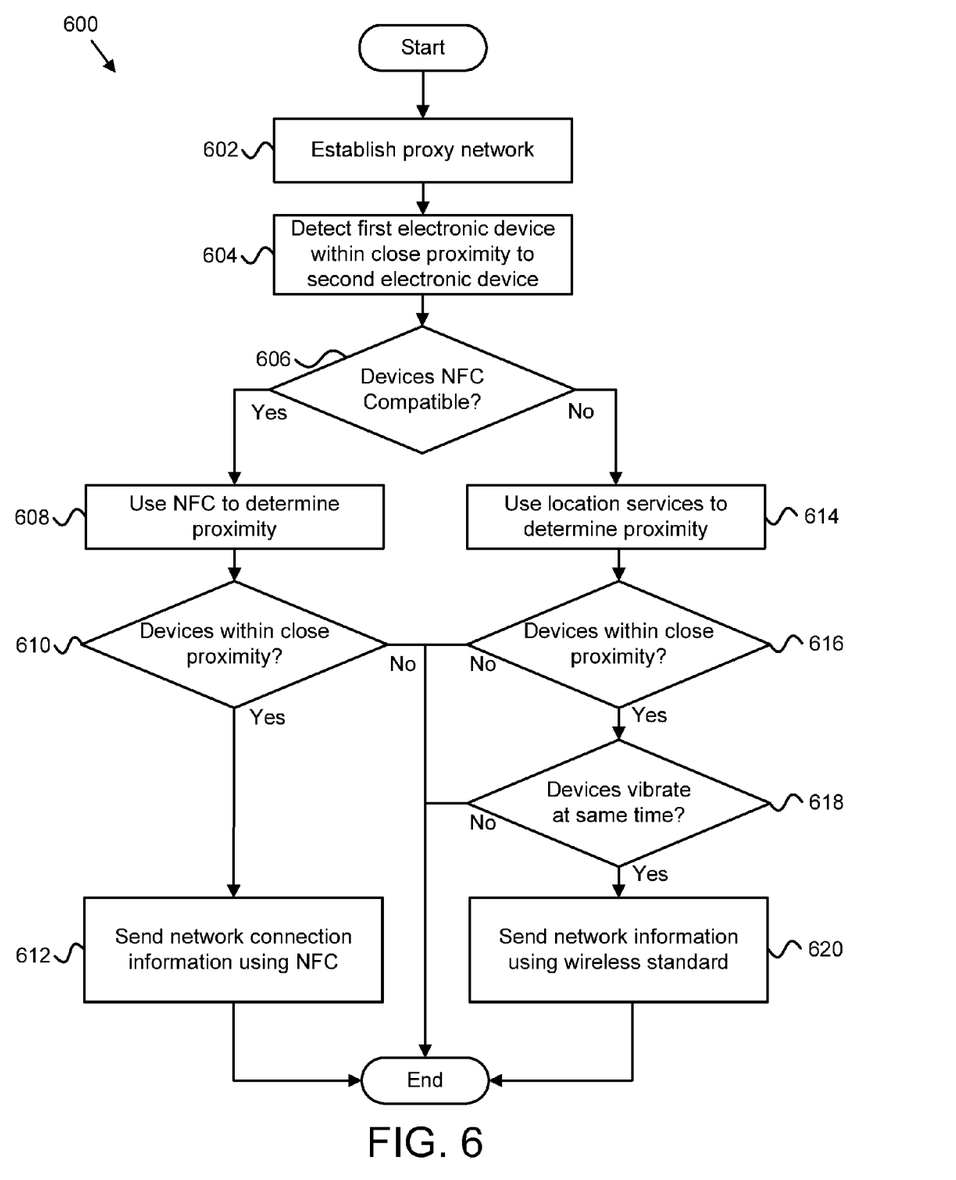
FIG. 6 is a schematic flow chart diagram illustrating another embodiment of a method for inviting a device to join a mesh network in accordance with the present subject matter.

FIG. 6 is a schematic flow chart diagram illustrating another embodiment of a method 600 for inviting a device to join a mesh network 102. The method 600 begins and establishes 602 a mesh network 102. In one embodiment, a mesh network 102 is established by one or more electronic devices 104. A network module 202, in certain embodiments, is configured to establish a mesh network 102. In some embodiments, the network module 202 establishes a P2P mesh network such that traffic sent within the network is propagated by the connected devices 104 and does not require networking hardware, such as routers, switches, bridges, hubs, or the like.

The method 600, in some embodiments, detects 604 a non-connected device 106 within close proximity to a connected device 104. In one embodiment, a proximity detection module 204 is configured to detect whether a non-connected device 106 is within close proximity to a connected device 104. In some embodiments, a touch detection module 302 is configured to detect the connected 104 and non-connected devices 106 are physically touching in order to verify that the non-connected device 106 is in close proximity to the connected device 104.

In other embodiments, the method 600 determines 606 whether the connected 104 and non-connected 106 devices include NFC capabilities. In one embodiment, the proximity detection module 302 determines whether an NFC connection can be established to determine whether the devices 104, 106 are NFC capable. If the method 600 determines that the devices 104, 106 have NFC capabilities, the method 600 uses 608 NFC to detect the non-connected device 106 is within close proximity to the connected device 104. In one embodiment, the touch detection module 302 determines the devices 104, 106 physically touched in response to establishing an NFC connection between the devices 104, 106. If the method 600 determines 610 that the devices 104, 106 are within close proximity by establishing an NFC connection, the method 600 may send 612 mesh network connection information from the connected device 104 to the non-connected device 106 using the NFC connection. The non-connected device 106 may join the mesh network 102 in response to receiving the mesh network connection information. In one embodiment, if the method 600 determines 610 that the devices 104, 106 are not within close proximity to one another the method 600 ends.

In another embodiment, if the method 600 determines that the devices 104, 106 are not NFC compatible, e.g., where neither device 104, 106 or only one device 104, 106 has NFC capabilities, the method 600 may use a combination of positioning and device 104, 106 vibration detection to determine the devices 104, 106 are within close proximity to each other. The method 600, in one embodiment, uses 614 location services to determine the devices 104, 106 are within a predetermined distance of each other. The location services may include GPS, control plane locating, GSM localization, near LBS, or the like. In some embodiments, the devices 104, 106 have compatible positioning capabilities. In other embodiments, the devices 104, 106 do not have compatible positioning capabilities and the touch detection module 302 uses different location services to determine the location of the devices 104, 106 and whether they are in close proximity to each other.

In one embodiment, if the method 600 determines 616 the devices 104, 106 are within a predetermined distance to each other, the method 600 determines 618 whether the devices 104, 106 vibrated at the same time to verify the devices 104, 106 physically touched. In certain embodiments, the touch detection module 302 determines the devices 104, 106 vibrated at the same time. In one embodiment, the touch detection module 302 determines the devices 104, 106 vibrated within a predetermined time period of each other, e.g., if the non-connected device 106 vibrated within a half-second after the connected device 104 vibrated. The touch detection module 302 may use the vibration detection capabilities of the devices 104, 106, such as an accelerometer in a smart phone, or the like. In some embodiments, the touch detection module 302 also measures the force of the vibration to determine whether the devices 104, 106 physically touched. Measuring the force of the vibration may help prevent attempting to connect a non-connected device 106 to the mesh network 102 if the devices 104, 106 unwittingly touched.

If the method 600 determines 616 the devices 104, 106 are within a predetermined distance of each other and determines 618 the devices 104, 106 vibrated at the same time, the method 600 may conclude that the devices 104, 106 physically touched and thus are within close proximity of each other. The method 600, in one embodiment, sends 620 network information from the connected device 104 to the non-connected device 106 using a wireless standard, such as WiFi, Bluetooth®, infrared, or the like. In one embodiment, the invitation module 206 sends 620 mesh network connection information using a wireless standard that is compatible with both devices 104, 106, e.g., using Bluetooth® where both devices 104, 106 have Bluetooth® capabilities. In some embodiments, the invitation module 206 sends 620 mesh network connection information using the Internet (the cloud). In certain embodiments, the invitation module 206 sends 620 mesh network connection information using a different wireless communication standard than the wireless communication standard used by the mesh network 102.

In other embodiments, the invitation module 206 sends a mesh network invitation to a non-connected device 106, which may require a user to confirm acceptance of the invitation. The invitation module 206 may send 620 mesh network connection information in response to receiving positive confirmation from a user. In certain embodiments, a user confirmation module 306 prompts a user to confirm the mesh network invitation and receives the user's response to the invitation. The invitation module 206, in other embodiments, encrypts the data, e.g., mesh network invitations, mesh network connection information, or the like, sent to the non-connected device 106. If the method 600 determines 616 the devices 104, 106 are not within close proximity or determines 618 the devices 104, 106 did not vibrate at the same time, the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a network interface accessible by the processor;
a memory storing machine readable code executable by the processor, the machine readable code comprising:
a network module configured to establish a mesh network via the network interface, the mesh network comprising one or more electronic devices;
a proximity detection module configured to detect a first electronic device within close proximity to a second electronic device, the first electronic device not connected to the mesh network and the second electronic device connected to the mesh network, wherein it is determined that the first electronic device is within close proximity to the second electronic device in response to determining that the first and second electronic devices are within a predetermined distance of each other and determining that the first and second electronic devices vibrated at the same time; and
an invitation module configured to send mesh network connection information to the first electronic device from the second electronic device in response to determining the first electronic device is within close proximity to the second electronic device.

2. The apparatus of claim 1, wherein the proximity detection module further comprises a touch detection module configured to detect the first and second electronic devices physically touched in order to verify the first electronic device is within close proximity to the second electronic device.

3. The apparatus of claim 2, wherein the touch detection module establishes a near field communication (NFC) connection between the first and second electronic devices to verify the first and second electronic devices physically touched.

4. The apparatus of claim 3, wherein the invitation module sends mesh network connection information from the second electronic device to the first electronic device over an NFC connection in response to the first and second electronic devices establishing an NFC connection.

5. The apparatus of claim 1, wherein the touch detection module determines whether a force of the vibration is within a predetermined threshold to verify the first and second electronic devices physically touched.

6. The apparatus of claim 1, wherein the invitation module sends mesh network connection information from the second electronic device to the first electronic device using a wireless communication standard in response to the first and second electronic devices physically touching, the wireless communication standard selected from the group consisting of Bluetooth®, Wi-Fi, and infrared.

7. The apparatus of claim 1, wherein the invitation module selects a wireless communication standard to send mesh network connection information between the first and second electronic devices, the wireless communication standard being selected based on the wireless communication capabilities of the first and second electronic devices, the first and second electronic devices having at least one compatible wireless communication standard.

8. The apparatus of claim 1, wherein the mesh network comprises a wireless communication standard different than the wireless communication standard used to send mesh network connection information from the second electronic device to the first electronic device.

9. The apparatus of claim 1, further comprising a handshaking module configured to establish the wireless communication parameters between the first and second electronic devices.

10. The apparatus of claim 1, further comprising a user confirmation module configured to prompt a user to confirm a mesh network invitation sent by the invitation module wherein mesh network connection information is transferred from the second electronic device to the first electronic device in response to a positive user confirmation.

11. The apparatus of claim 1, further comprising an encryption module configured to encrypt data sent between the one or more electronic devices connected to the mesh network.

12. A method comprising:
establishing a mesh network, the mesh network comprising one or more electronic devices;
detecting a first electronic device within close proximity to a second electronic device, the first electronic device not connected to the mesh network and the second electronic device connected to the mesh network, wherein it is determined that the first electronic device is within close proximity to the second electronic device in response to determining that the first and second electronic devices are within a predetermined distance of each other and determining that the first and second electronic devices vibrated at the same time; and
sending mesh network connection information to the first electronic device from the second electronic device in response to determining the first electronic device is within close proximity to the second electronic device.

13. The method of claim 12, further comprising detecting the first and second electronic devices physically touched in order to verify the first electronic device is within close proximity to the second electronic device.

14. The method of claim 13, further comprising establishing a near field communication (NFC) connection between the first and second electronic devices to verify the first and second electronic devices physically touched.

15. The method of claim 14, further comprising sending mesh network connection information from the second electronic device to the first electronic device over an NFC connection in response to the first and second electronic devices establishing an NFC connection.

16. The method of claim 12, further comprising sending mesh network connection information from the second electronic device to the first electronic device using a wireless communication standard in response to the first and second electronic devices physically touching, the wireless communication standard selected from the group consisting of Bluetooth®, Wi-Fi, and infrared.

17. The method of claim 12, wherein the mesh network comprises a wireless communication standard different than the wireless communication standard used to send mesh network connection information from the second electronic device to the first electronic device.

18. A program product comprising a non-transitory computer readable storage medium storing machine readable code executable by a processor to:
- establish a mesh network, the mesh network comprising one or more electronic devices;
- detect a first electronic device within close proximity to a second electronic device, the first electronic device not connected to the mesh network and the second electronic device connected to the mesh network, wherein it is determined that the first electronic device is within close proximity to the second electronic device in response to determining that the first and second electronic devices are within a predetermined distance of each other and determining that the first and second electronic devices vibrated at the same time; and
- send mesh network connection information to the first electronic device from the second electronic device in response to determining the first electronic device is within close proximity to the second electronic device.

* * * * *